United States Patent Office 3,637,624
Patented Jan. 25, 1972

3,637,624
POLYMERIZATION OF VINYL CHLORIDE
IN BULK
Sergio Lo Monaco, Vicenza, Corrado Mazzolini, Mestre, and Luigi Patron and Alberto Moretti, Venice, Italy, assignors to Chatillon Società Anonima Italiana per le Fibre Tessili Artificiali S.p.A., Milan, Italy
No Drawing. Continuation-in-part of applications Ser. No. 671,216, Sept. 28, 1967, and Ser. No. 885,293, Dec. 15, 1969. This application Feb. 27, 1970, Ser. No. 15,218
Claims priority, application Italy, Feb. 28, 1969, 13,473/69
Int. Cl. C08f 1/04, 1/61, 3/30
U.S. Cl. 260—85.5
15 Claims

ABSTRACT OF THE DISCLOSURE

Vinyl chloride is polymerized in bulk utilizing a polymerization catalyst comprised of an organic hydroperoxide, sulphur dioxide and an alcoholate of a Group I or II metal of the Periodic Table, or of aluminum, said alcoholate having from 1 to 6 carbon atoms, by conducting the polymerization at temperatures ranging from between 0° C. and about 100° C. and according to a continuous or semi-continuous process, with the gradual addition of the components of the catalytic system to the monomer.

CROSS REFERENCE TO RELATED APPLICATIONS

This application is a continuation-in-part of our copending applications, Ser. No. 671,216, filed Sept. 28, 1967, and Ser. No. 885,293, filed Dec. 15, 1969.

In said copending application, Ser. No. 671,216, there is disclosed and claimed a process for bulk-polymerizing vinyl chloride at low temperatures (e.g. lower than 0° C.) in the presence of a catalytic system comprised of an organic hydroperoxide, sulphur dioxide and an alcoholate of a metal of the first or second group of the Periodic Table or aluminum, and wherein the molar ratio (R—O)⁻/SO₂ (wherein R is a linear or branched chain alkyl radical having from 1 to 6 carbon atoms) does not exceed 2. As described in the aforesaid copending application, the bulk polymerization may be conducted in continuous, semi-continuous or discontinuous manner. The subject catalytic system is characterized by a high decomposition velocity at temperatures far below 0° C., for instance at temperatures comprised between −20° C. and −60° C. As a matter of fact, at such low temperatures, even when using hydroperoxide concentrations lower than 0.1% with respect to the monomer, there are attained high polymerization speeds. This especial kinematic behaviour of the above mentioned catalytic system apparently preempted its applicability to the high temperature polymerization of vinyl chloride for instance at temperatures above 10° C.

In point of fact, it is known that in the event the decomposition speed of a catalytic system is too high, there occurs an inhibition of the polymerization following the recombination of the polymeric radicals with the primary radicals.

Copending application, Ser. No. 885,293, relates to a similar bulk-polymerization of vinyl chloride at low temperatures utilizing a polymerization catalyst comprised of an organic hydroperoxide, sulphur dioxide and an alcoholate, except that the alcoholate is necessarily one of a Group I metal of the Periodic Table and the said alcoholate and sulphur dioxide are present in a molar ratio of at least 2.

It has now been surprisingly found that the polymerization of the vinyl chloride in bulk and at temperatures above 0° C. may effectively be conducted by employing a catalytic system comprised of an organic hydroperoxide, sulphur dioxide and at least one alcoholate of a Group I or Group II metal of the Periodic Table, or of aluminum, provided that the polymerization be conducted according to a continuous or semi-continuous process, with the gradual addition to the monomer of the components of the catalytic system.

It has in fact been ascertained that, in the instance of conducting the polymerization by instantaneously adding to the monomer contained in a polymerization actoclave the entire amount of the components of the catalytic system foreseen by the formulation (in a process that may be defined as discontinuous), one does not obtain any appreciable polymerization.

In the following Table I there are recorded polymerization conversions and intrinsic viscosity of the polymer obtained depending on whether the bulk polymerization was conducted according to a continuous, semi-continuous or discontinuous process, by using the above mentioned catalytic system.

TABLE I

| Polymerization process | Feeding time of the catalyst in hrs. | Reaction [1] | Conversion in percent | Intrinsic viscosity in dl./g. |
|---|---|---|---|---|
| Discontinuous | 0 | 10 | 1.8 | 0.3 |
| Semi-continuous | 10 | 10 | 38 | 1.3 |
| Continuous | | 10 | 43 | 1.5 |

[1] Time or contact time of the reactants with each other in hours (dwell time).

The polymerization was conducted in bulk at 40° C., by using as a catalyst a catalytic system comprised of cumene hydroperoxide, sulphur dioxide and magnesium methylate, the latter being introduced as a 10% methanolic solution. The quantity of cumene hydroperoxide amounted to 0.15% with respect to the monomer, the molar ratio sulphur dioxide/cumene hydroperoxide equalled 2 while the molar ratio sulphur dioxide/magnesium methylate was 2.

The catalytic stsyem employed in the process of this invention offers the advantage, with respect to the catalysts commonly employed in the bulk polymerization of vinyl chloride, of being industrially effective even when used in small quantities this due to its high efficiency and high decomposition speed. The possibility of conducting the polymerization with small amounts of catalyst other than representing a great economic advantage, also allows one to obtain polymers with excellent color and thermal stability characteristics.

As reflected in said copending application, Ser. No. 671,216, by the term organic hydroperoxide there are intended those organic compounds of the general formula R—O—O—H, in which R may be a linear or branched alkyl radical, a cycloalkyl radical, an aryl radical, or an aryl-alkyl radical.

Examples of such hydroperoxides which may be conveniently used in the process of this invention are methyl-, ethyl-, n-propyl-, iso-propyl-, tert.-butyl-, n-butyl-, iso-butyl-, amyl-, hexyl-, octyl-, etc. hydroperoxide, di-isopropyl-benzene-hydroperoxide; phenyl-ethyl hydroperoxide; phenyl-isobutyl-hydroperoxide; phenyl - isopropyl-hydroperoxide; 1 hydroxyethyl-hydroperoxide; methyl-ethyl-ketone hydroperoxide; α-α-di-methyl-benzyl-hydroperoxide; p-isopropyl-α-α-di-methyl-benzyl-hydroperoxide; p-menthane hydroperoxide. Particularly advantageous results are attained by using cumene hydroperoxide or tertiary-butyl-hydroperoxide.

The concentration of the organic hydroperoxide is not critical and, in general, may vary from about 0.01 to 3% by weight with respect to the monomers. However, in practice, concentrations of hydroperoxide not exceeding 0.4% are preferred.

The organic hydroperoxide may be fed to the reaction mass either as such or in solution in a suitable solvent such as methyl alcohol, ethyl alcohol, propyl alcohol, and the like.

The concentration of the sulphur dioxide is also not critical and, in general, varies from about 0.01% to 2% by weight with respect to the monomers. There may, however, also be used concentrations greater than 2%, although in practice such concentrations do not lead to any appreciable increase in the polymerization speed.

By alcoholates there are intended those compounds of the general formula $(R-O)_nMe$ wherein R is a linear or branched alkyl radical having from 1 to 6 carbon atoms, Me is a metal of Group I or Group II of the Periodic Table or aluminum and $n$ may be 1, 2 or 3- depending on the valence of Me.

The short-chained alcoholates, with from 1 to 3 carbon atoms, are preferred for reasons of solubility. Amongst these, the alcoholates obtained via the direct reaction between the alcohol and an alkali or alkaline earth metal are particularly preferred by reason of their cheapness and ease of preparation.

The concentration of the alcoholate in the reaction medium varies from between about 0.01% and 5% by weight with respect to the monomers. However, concentrations comprised from between about 0.03% and 1% are preferred.

The alcoholates may be added to the reaction mass either as such or, better still, dissolved in a non-reactive organic solvent. The optimum solvents for alcoholates are aliphatic alcohols having from 1 to 5 carbon atoms, and, of these, methylalcohol and ethylalcohol are the preferred.

In practice it is preferred to feed the alcoholate, partially or totally, with an alcoholic solution containing the quantity of sulphur dioxide foreseen by the formulation.

This alcoholic solution is preferably prepared by dissolving the alcoholate in the solvent containing the desired quantity of sulphur dioxide. In this way it is possible to obtain very concentrated solutions of alcoholate.

The organic solvents used for the preparation of the solution must be anhydrous in order to avoid the hydrolysis of the alcoholate.

The temperature at which the polymerization is conducted may vary between 0° C. and 100° C., but preferably is conducted at temperatures comprised between 20° C. and 60° C.

By "bulk polymerization" there is intended not only the polymerization carried out in the undiluted monomer, but also a polymerization which is conducted in the presence of non-reactive organic compounds, which compounds are liquid at polymerization temperatures and which exert a fluidizing action on the polymerization mass to render the same more easily stirrable and to facilitate heat exchange.

The presence of these organic compounds does not exert any influence on the polymerization reaction, and their concentration may, if required, be equal to that of the monomers.

As fluidizing organic compounds the following substances may be employed: aliphatic hydrocarbons, arylhydrocarbons, cycloalkyl-hydrocarbons, saturated halogenated hydrocarbons, these latter being the preferred.

To the polymerization mass there may be added in small quantities, for instance from 50 to 1000 p.p.m. with respect to the monomer, of alkyl-mercaptans in order to regulate or control the molecular weight of the polymer. It has, furthermore, been observed that the alkyl-mercaptans, besides functioning as chain regulators, also serve to fluidize the polymerization slurry. Of the alkyl-mercaptans intended, those having from 1 to 15 carbon atoms are the preferred, but those having not more than 4 carbon atoms afford the best results.

It is advisable to conduct the polymerization in the absence of oxygen which exerts an inhibiting effect on the polymerization.

In general, for this purpose there are employed suitable inert gases such as nitrogen.

As stated previously, an essential condition in order that the polymerization take place, is that the polymerization process be conducted in either a continuous or semi-continuous manner.

By "continuous polymerization" there is intended a process in which the components of the catalytic system and the monomer are fed continuously and separately; the feed rate of the monomer, in relation to the volume of the reactor, determines the means contact time of the reactants with each other. In such a process the reaction mixture is continuously removed from the reactor through an over-flow discharge.

By 'semi-continuous polymerization" there is intended a process in which into a closed reactor containing the monomer the components of the catalytic system are fed over a prolonged period of time. In this case the polymer is recovered at the end of the reaction.

The polymerization may be inhibited at a desired level and at the desired molecular weight by treating the polymerization mass with an aqueous solution or an alcoholic solution of a salt of hydroxylamine, preferably a hydroxyamine hydrochloride or hydroxylamine sulphate.

The polyvinyl chloride obtained according to the process of this invention is very white and exhibits excellent thermal stability, and a homogeneous molecular weight, as well as a high apparent density; this latter property being highly appreciated in the application of this polymer both for the production of fibers, as well as of plastic materials.

It is to be understood that the catalytic systems employed in the process of the present invention may also be advantageously applied in the preparation of vinyl chloride copolymers containing up to 50% by weight of at least one other ethylenically unsaturated monomer copolymerizable with vinyl chloride. The only difference with regard to the above described process is that the starting monomers are a mixture of vinyl chloride with one or more other ethylenically unsaturated monomers copolymerizable with the said vinyl chloride.

By the term "ethylenically unsaturated monomers" there are intended compounds containing the C=C group. Examples for such compounds are: vinyl and vinylidene compounds, such as vinylidene fluoride and vinylidene chloride; vinyl fluoride; vinyl esters of aliphatic carboxylic acids containing from 2 to 18 carbon atoms, such as, for instance, the vinyl esters of acetic acid, of propionic acid, etc.; monomers of the acrylic type, such as acrylic acid, methyacrylic acid and their derivatives, such as acrylonitrile, acrylates and methacrylates of aliphatic alcohols containing from 1 to 12 carbon atoms, etc.

In order to further illustrate the present invention and the advantages thereof, the following specific examples are given, it being understood that same are intended merely as illustrative and in no wise limitative.

EXAMPLES 1–3

Into an autoclave with a holding capacity of 3 liters, provided with an external heating sleeve, a stirrer and a thermometer, and preloaded with 2,000 g. of vinyl chloride and 500 g. of ethyl chloride there were introduced over a period of 10 hours, an organic hydroperoxide of the type and in the feed rate reported in Table II;
sulphur dioxide in a feed rate as reported in Table II;
an alcoholate of the type and at a feed rate as indicated in Table II.

At the end of the feeding, the polymer suspension thus obtained was discharged into an aqueous solution of hydroxylamine hydrochloride maintained at 50° C. and at pH 6 by the addition of sodium bicarbonate in order to stop the polymerization. The polymer was then separated by centrifuging and subsequently washed with water and finally dried at 70° C. in a forced air oven.

The polymerization conversion, intrinsic viscosity ($\eta$) and the apparent density of the polymer thus obtained are recorded in the following Table II.

The intrinsic viscosity ($\eta$) is determined in cyclohexanone at 30° C. and is expressed in dl./g.

The apparent density is expressed in g./cm.$^3$.

TABLE II

| Organic hydroperoxide | | Sulphur dioxide, g./hr. | Alcoholate | | Temperature in °C. | Conversion in percent | Intrinsic viscosity in dl./g. | Apparent density in g./cc. |
|---|---|---|---|---|---|---|---|---|
| Type | g./hr. | | Type | g./hr. | | | | |
| Cumene hydroperoxide | 0.166 | 0.15 | Magnesium methylate | 0.10 | 25 | 28 | 1.1 | 0.43 |
| tert. Butyl hydroperoxide | 0.1 | 0.15 | Sodium methylate | 0.13 | 50 | 40 | 1.3 | 0.45 |
| tert. Butyl hydroperoxide | 0.08 | 0.12 | Magnesium ethylate | 0.10 | 30 | 31 | 1.5 | 0.46 |

What is claimed is:

1. In a process for the bulk polymerization of vinyl chloride utilizing a polymerization catalyst consisting essentially of a catalytically effective amount of each of an organic hydroperoxide, sulphur dioxide, and an alcoholate of a Group I or II metal of the Periodic Table, or of aluminum, said alcoholate having from 1 to 6 carbon atoms, the improvements which comprise: (a) conducting the polymerization at temperatures ranging from between 0° C. and about 100° C. and (b) according to a continuous or semi-continuous process, with the gradual addition of the components of the catalytic system to the monomer.

2. The process as defined by claim 1, wherein the alcoholate has from 1 to 3 carbon atoms.

3. The process as defined by claim 1, wherein the alcoholate is introduced to the reaction mass as a solution in an aliphatic alcohol having from 1 to 5 carbon atoms.

4. The process as defined by claim 1, wherein both the alcoholate and the sulphur dioxide are introduced to the reaction mass as a solution in aliphatic alcohol having from 1 to 5 carbon atoms.

5. The process as defined by claim 1, wherein the concentration of the alcoholate ranges from between about 0.01 and 5% by weight based on weight monomer.

6. The process as defined by claim 5, wherein the concentration of the alcoholate ranges from between about 0.03 and 1% by weight based on weight monomer.

7. The process as defined by claim 1, wherein the concentration of the organic hydroperoxide ranges from between about 0.01 and 3% by weight based on weight monomer.

8. The process as defined by claim 7, wherein the concentration of the organic hydroperoxide does not exceed 0.4% by weight based on weight monomer.

9. The process as defined by claim 1, wherein the organic hydroperoxide is selected from the group consisting of cumene hydroperoxide and tert-butyl-hydroperoxide.

10. The process as defined by claim 1, wherein the concentration of the sulphur dioxide ranges from between about 0.01 and 2% by weight based on weight monomer.

11. The process as defined by claim 1, wherein the vinyl chloride is copolymerized with up to 50% of at least one other ethylenically unsaturated monomer copolymerizable therewith.

12. The process as defined by claim 1, wherein the reaction is conducted in the presence of an alkyl-mercaptan having from 1 to 15 carbon atoms.

13. The process as defined by claim 12, wherein the mercaptan has a maximum of 4 carbon atoms and is fed to the polymerization mass in amounts ranging from between about 50 to 1,000 parts per million.

14. The process as defined by claim 1, wherein the polymerization is conducted in the presence of an inert fluidizing agent.

15. The process as defined by claim 1, wherein the polymerization is inhibited at the level desired by treating the polymerization mass with a solution of a salt of hydroxylamine.

References Cited
UNITED STATES PATENTS 3,255,164   3/1966   Visger et al. _____ 260—863

JOSEPH L. SCHOFER, Primary Examiner

J. A. DONAHUE, JR., Assistant Examiner

U.S. Cl. X.R.

260—86.3, 87.1, 87.5 A, 87.7, 92.8